(12) United States Patent
Son (10) Patent No.: US 11,588,305 B2
(45) Date of Patent: Feb. 21, 2023

(54) DISTRIBUTION BOARD VENTILATION SYSTEM

(71) Applicant: LS ELECTRIC CO., LTD., Anyang-si (KR)

(72) Inventor: Minsoo Son, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 133 days.

(21) Appl. No.: 17/299,662

(22) PCT Filed: Aug. 29, 2019

(86) PCT No.: PCT/KR2019/011033
§ 371 (c)(1),
(2) Date: Jun. 3, 2021

(87) PCT Pub. No.: WO2020/138637
PCT Pub. Date: Jul. 2, 2020

(65) Prior Publication Data
US 2022/0037863 A1 Feb. 3, 2022

(30) Foreign Application Priority Data

Dec. 28, 2018 (KR) .................... 20-2018-0006159

(51) Int. Cl.
*H02B 1/56* (2006.01)
*H02B 13/025* (2006.01)
*H02B 1/38* (2006.01)

(52) U.S. Cl.
CPC ........... *H02B 1/565* (2013.01); *H02B 13/025* (2013.01); *H02B 1/38* (2013.01)

(58) Field of Classification Search
CPC ......... H02B 13/025; H02B 1/38; H02B 1/565
See application file for complete search history.

(56) References Cited

U.S. PATENT DOCUMENTS 5,574,624 A * 11/1996 Rennie ..................... H02B 1/56
361/676
5,689,097 A * 11/1997 Aufermann .......... H02B 13/025
361/676

(Continued)

FOREIGN PATENT DOCUMENTS

DE 1048626 B * 1/1956 ........... H02B 13/025
DE 3013756 A1 * 10/1981 ............... H02B 1/56

(Continued)

OTHER PUBLICATIONS

International Search Report for related International Application No. PCT/KR2019/011033; report dated Jul. 2, 2020 (5 pages).

*Primary Examiner* — Robert J Hoffberg
(74) *Attorney, Agent, or Firm* — K&L Gates LLP (57) ABSTRACT

The present disclosure relates to a distribution board ventilation system including a circulation chamber serving as a passage for air circulation and arc discharge; a first compartment provided at one surface of the circulation chamber; a second compartment which is adjacent to the first compartment and provided at the other surface adjacent to the one surface of the circulation chamber; a first discharge door mounted on the one surface of the circulation chamber to open the first compartment; a second discharge door mounted on the other surface of the circulation chamber to open the second compartment; and a linking means which is mounted between the first discharge door and the second discharge door and ensures that the open states of the first discharge door and the second discharge door are mutually exclusive.

10 Claims, 7 Drawing Sheets

(56) References Cited

U.S. PATENT DOCUMENTS

| | | | | |
|---|---|---|---|---|
| 5,878,905 | A | * | 3/1999 | Gronbach .............. H02B 13/025 174/17 VA |
| 5,892,195 | A | * | 4/1999 | Aufermann ............ H02B 1/565 361/678 |
| 9,426,907 | B2 | * | 8/2016 | Karandikar .......... H02B 13/025 |
| 10,305,262 | B2 | * | 5/2019 | Johnson ................. H02B 1/306 |
| 10,587,098 | B2 | * | 3/2020 | Johnson ................. H02B 1/306 |
| 10,622,790 | B2 | * | 4/2020 | Kim ........................ H02B 1/30 |
| 2017/0256922 | A1 | | 9/2017 | Rajauria et al. |

FOREIGN PATENT DOCUMENTS

| | | | | |
|---|---|---|---|---|
| DE | 3927835 | A1 * | 2/1991 | ............... H02B 1/22 |
| DE | 10041130 | C1 * | 6/2002 | ........... H02B 13/025 |
| JP | 08-168117 | A | 6/1996 | |
| JP | 2004129464 | A | 4/2004 | |
| KR | 100954900 | B1 | 4/2010 | |
| KR | 20150039337 | A | 4/2015 | |
| KR | 10-1538090 | B1 | 7/2015 | |
| KR | 10-1622445 | B1 | 7/2015 | |
| KR | 101581350 | B1 | 12/2015 | |
| KR | 2020170000349 | U | 1/2017 | |
| KR | 101799954 | B1 | 12/2017 | |

\* cited by examiner

Fig. 1

Prior Art

DISTRIBUTION BOARD VENTILATION SYSTEM

CROSS-REFERENCE TO RELATED APPLICATIONS

This application is the National Stage filing under 35 U.S.C. 371 of International Application No. PCT/KR2019/011033, filed on Aug. 29, 2019, which claims the benefit of earlier filing date and right of priority to Korea utility model Application No. 20-2018-0006159 filed on Dec. 28, 2018, the contents of which are all hereby incorporated by reference herein in their entirety.

FIELD

The present disclosure relates to a distribution board ventilation system and, more specifically, to a distribution board ventilation system which is linked with an arc discharge action.

BACKGROUND

In general, a distribution board (or a switchboard) is a device used for monitoring, controlling and protecting power system. The distribution board accommodates therein various electric devices such as a circuit breaker, a current transformer, and the like for driving or controlling a power plant, a substation, etc., driving an electric motor, and the like.

When an arc is generated in such distribution board due to a short-circuit, a ground fault, dielectric breakdown, or the like, arc gas of high temperature and high pressure is generated in the distribution board. The distribution board shall be capable of rapidly discharging arc gas of high temperature and high pressure generated due to such faults to outside so as to protect electric devices thereof and lives.

Therefore, the distribution board is provided with a duct to construct a route (or path) through which arc gas is discharged. Arc gas generated inside the distribution board may be discharged to outside through the duct provided in the distribution board.

In order to reduce damage to surroundings caused by the high-temperature gas discharged outside, the arc gas needs to be cooled or slowed down when discharged through such an arc ventilation passage or a duct.

In addition, in the distribution board, each of compartments is provided with a discharge door so that the arc is discharged from each of the compartments to the outside.

Figure 1:
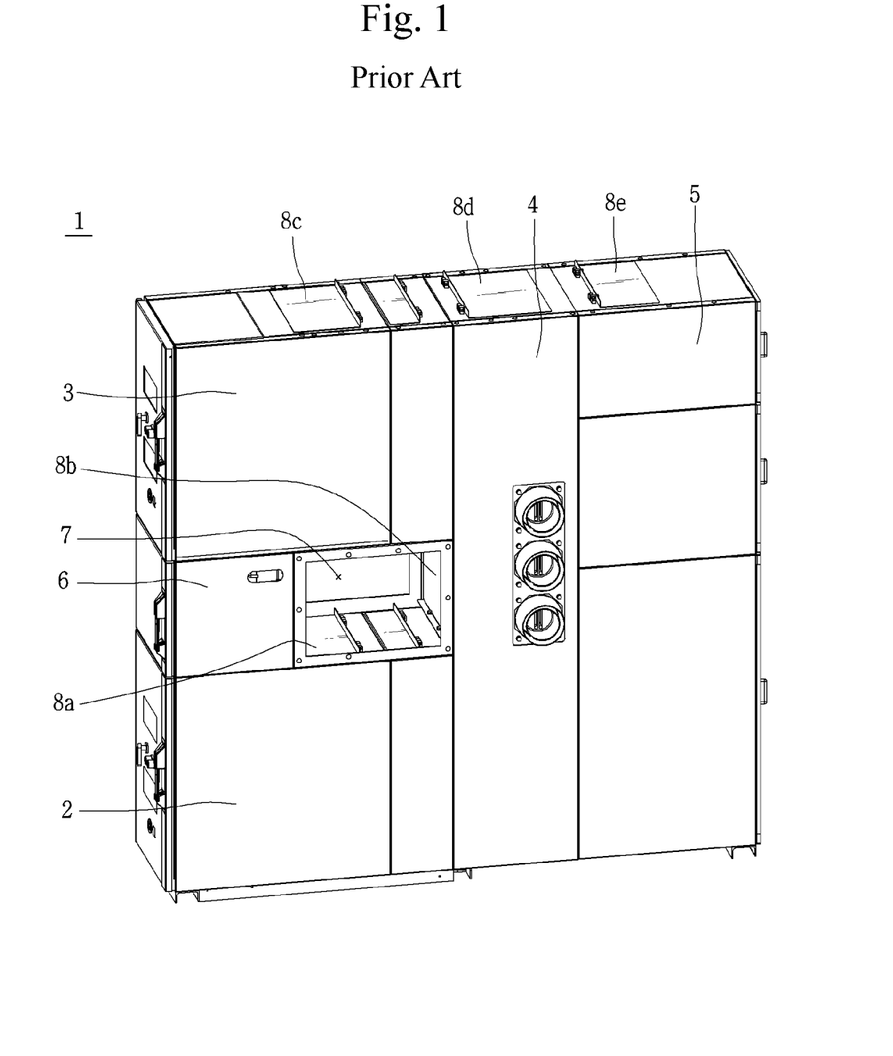
FIG. 1 is a perspective view of a distribution board according to the related art.

FIG. 1 shows a distribution board structure according to the related art.

A distribution board 1 according to the related art includes a first compartment 2 provided at a lower stage, a second compartment 3 provided at an upper stage, a bus bar compartment 4 and a cable compartment 5 provided at rear sides of the first compartment 2 and the second compartment 3 to accommodate therein electric devices such as a circuit breaker. A low voltage compartment 6 is interposed between the first compartment 2 and the second compartment 3.

Further, an arc ventilation duct 7 is interposed between the first compartment 2 and the second compartment 3.

A first discharge door 8a is provided between the first compartment 2 and the arc ventilation duct 7, and a second discharge door 8b is provided between the bus bar compartment 4 and the arc ventilation duct 7. When an arc is generated in the first compartment 2 or in the bus bar compartment 4, the first discharge door 8a or the second discharge door 8b is opened so that the arc is discharged through the arc ventilation duct 7.

Meanwhile, a third discharge door 8c, a fourth discharge door 8d, and a fifth discharge door 8e are each provided at an upper surface of each of the second compartment 3, the bus bar compartment 4, and the cable compartment 5, so that high-temperature and high-pressure gas is discharge when an arc is generated.

Meanwhile, there is also needed a cooling system for lowering temperature inside the distribution board. In other words, a vent or a door for air circulation shall be provided to facilitate ventilation inside the distribution board 1. And, the door shall be opened.

In summary, in the distribution board, the door needs to have conflicting functions because the door should be closed in a steady state from a viewpoint of preparing for an arc accident, and should normally be opened from a viewpoint of internal ventilation.

SUMMARY

The present disclosure is to solve the aforementioned problems, and an aspect of the present disclosure is to provide a distribution board ventilation system in which a discharge door operates to satisfy an arc gas discharge function and a ventilation function.

A distribution board ventilation system according to an embodiment of the present disclosure includes: a circulation chamber serving as a passage for air circulation and arc discharge; a first compartment provided at one surface of the circulation chamber; a second compartment which is adjacent to the first compartment and provided at another surface adjacent to the one surface of the circulation chamber; a first discharge door mounted on the one surface of the circulation chamber to open the first compartment; a second discharge door mounted on the another surface of the circulation chamber to open the second compartment; and a linking means which is mounted between the first discharge door and the second discharge door and ensures that open states of the first discharge door and the second discharge door are mutually exclusive.

Here, the linking means includes a first fixing member fixed to a part of the first discharge door; a second fixing member fixed to a part of the second discharge door; and a connecting member with one end thereof rotatably coupled to the first fixing member and another end thereof rotatably coupled to the second fixing member.

Further, the first fixing member is mounted on an upper end portion of the first discharge door, and the second fixing member is mounted on an upper end portion of the second discharge door.

In addition, the first fixing member is mounted on a first skirt portion at a lower end of the first discharge door, and the second fixing member is mounted on a second skirt portion at a lower end of the second discharge door.

In addition, the first fixing member has a first hole and the second fixing member has a second hole, and the connecting member is fastened to each of the first hole and the second hole by a fastening member.

In addition, the first fixing member is mounted in a direction same as a direction in which the first skirt portion is extended, and the second fixing member is mounted in a direction perpendicular to a direction in which the second skirt portion is extended.

In addition, a length of the connecting member is shorter than a distance between the first fixing member and the second fixing member in a state in which the first discharge door and the second discharge door are closed.

In addition, opposite ends of the connecting member each has a connection hole communicating with each of the first hole and the second hole.

In addition, any one of the connection holes is implemented as a sliding hole.

In addition, the distribution board ventilation system further includes a third discharge door mounted on one surface of the circulation chamber to open the first compartment, wherein an intermediate portion of the connecting member is connected to the third discharge door.

In addition, the connecting member includes a first connecting portion connecting the first discharge door and the third discharge door, and a second connecting portion connecting the third discharge door and the second discharge door and forming a predetermined angle with the first connecting portion.

With regard to a distribution board ventilation system according to an embodiment of the present disclosure, a discharge door of a compartment that needs air circulation is opened in a steady state and a discharge door of another compartment adjacent thereto is closed. And, when an arc is generated, a discharge door of a compartment where the arc is generated is opened and a discharge door of another compartment adjacent thereto is closed. Accordingly, the discharge door may effectively perform conflicting functions which serves as a passage with being opened for air circulation in a normal state and for arc discharge in an arc accident, and as a closing portion with being closed in an arc accident.

DETAILED DESCRIPTION

Hereinafter, preferred embodiments of the present disclosure will be described with reference to the accompanying drawings, but this is to explain in detail enough for those skilled in the art to easily implement the disclosure, and it does not mean that the technical idea and scope of the disclosure are limited thereto.

Figure 2:
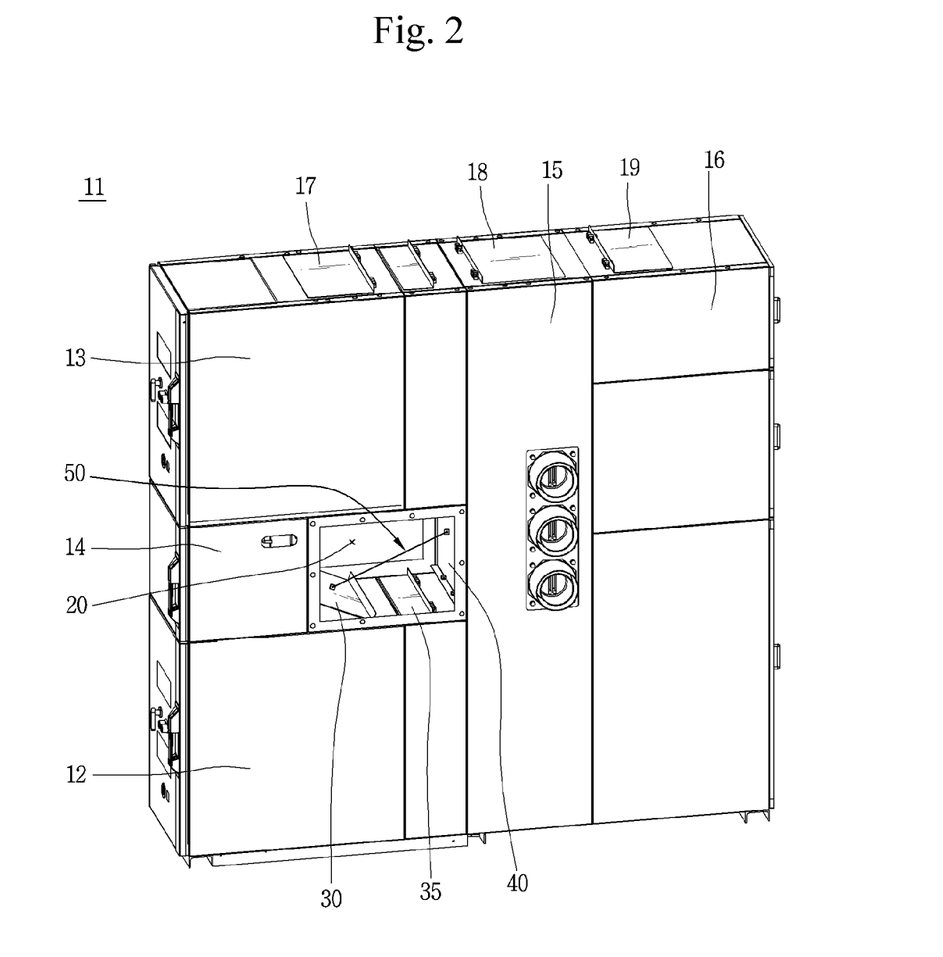
FIG. 2 is a perspective view of a distribution board in accordance with one embodiment of the present disclosure.
Figure 3:
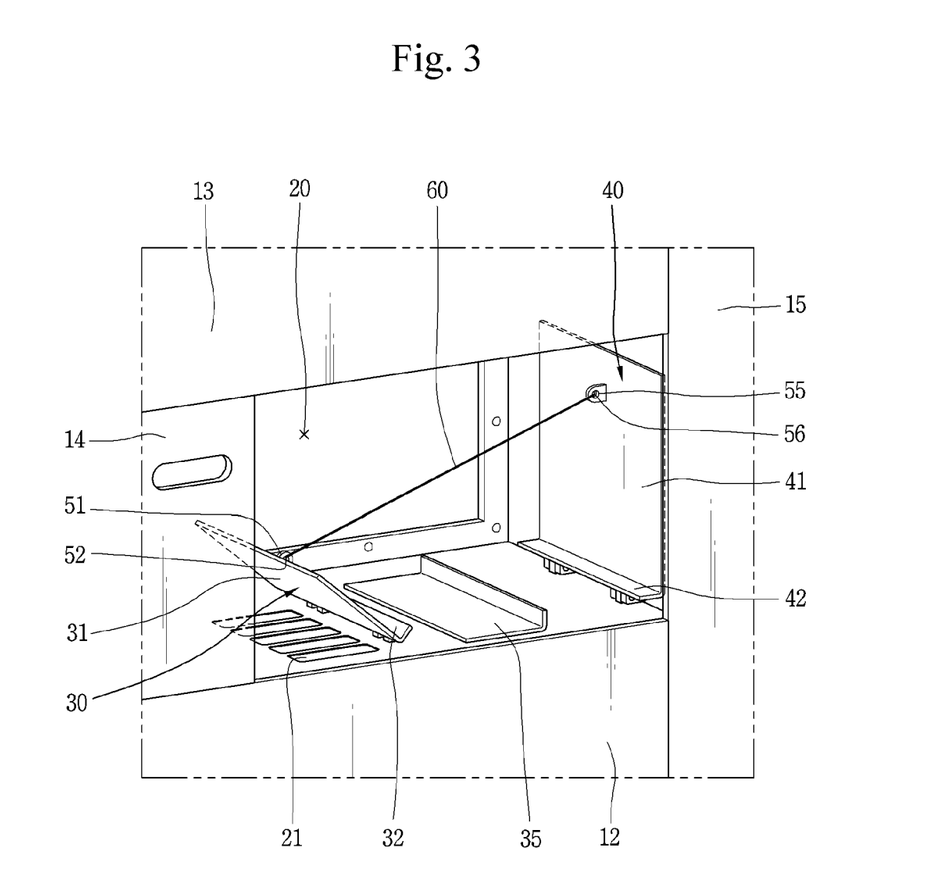
FIG. 3 is a detailed view of a circulation chamber in FIG. 2.

FIG. 2 is a perspective view of a distribution board in accordance with one embodiment of the present disclosure, and FIG. 3 is a detailed view of a circulation chamber in FIG. 2. Hereinafter, a distribution board ventilation system according to one embodiment of the present disclosure will be described in detail with reference to the drawings.

A distribution board ventilation system according to an embodiment of the present disclosure includes: a circulation chamber 20 serving as a passage for air circulation and arc discharge; a first compartment 12 provided at one surface of the circulation chamber 20; a second compartment 15 which is adjacent to the first compartment 12 and provided at another surface adjacent to the one surface of the circulation chamber 20; a first discharge door 30 mounted on the one surface of the circulation chamber 20 to open the first compartment 12; a second discharge door 40 mounted on the another surface of the circulation chamber 20 to open the second compartment 15; and a linking means 50 which is mounted between the first discharge door 30 and the second discharge door 40 and ensures that the open states of the first discharge door 30 and the second discharge door 40 are mutually exclusive.

An enclosure (or cabinet) 11 of a distribution board will be described first. An enclosure 11 of a distribution board according to one embodiment of the present disclosure is divided into a plurality of compartments. In an example, the enclosure 11 of the distribution board may include breaker compartments (a first breaker compartment 12 and a second breaker compartment 13), a low voltage compartment 14, a bus bar compartment 15, and a cable compartment 16. Here, the first breaker compartment 12 (or first compartment) is provided at a lower stage of the enclosure 11, and the second breaker compartment 13 is provided at an upper stage of the enclosure 11.

A compartment mounted at a first stage (or lower stage) of the enclosure 11 is referred to as a first compartment (or first breaker compartment) 12 and a compartment mounted close to the first compartment is referred to as a second compartment (or bus bar compartment) 15. The first compartment 12 and the second compartment 15 are mainly used as a breaker compartment or a bus bar compartment. Description of a circuit breaker is omitted.

A low voltage compartment 14 is provided between the first compartment (or first breaker compartment) 12 and the second breaker compartment 13. Here, the low voltage compartment 14 is formed to be shorter in length (in a back-and-forth direction) than the first compartment 12 and the second breaker compartment 13. The low voltage compartment 14 may accommodate therein a low-pressure device, a potential transformer, a current transformer, an accessory device, and the like.

The second compartment (of bus bar compartment) 15 and the cable compartment 16 are sequentially provided at rear sides of the first compartment 12 and the second breaker compartment 13.

The circulation chamber 20 is surrounded by the first compartment 12, the second compartment 15, the second breaker compartment 13, and the low voltage compartment 14. The circulation chamber 20 may be provided at a height same as that of the low voltage compartment 14. Here, the circulation chamber 20 is provided at a rear side of the low voltage compartment 14. This is to allow the circulation chamber 20 to be disposed adjacent to a terminal of a circuit breaker (not shown). The circulation chamber 20 is brought into contact with each of the low voltage compartment 14 mounted at a front portion, the second compartment 15 mounted at a rear portion, the first compartment 12 mounted at a lower portion, and the second breaker compartment 13 mounted at an upper portion.

Left and right sides of the circulation chamber 20 are opened so that the circulation chamber 20 is to be a space to circulate air and discharge an arc. In other words, when a plurality of distribution boards 11 are arranged in parallel, the circulation chamber 20 is used as a passage for cooling by air circulation and for arc gas discharge in case of an arc accident.

The first discharge door 30 and a third discharge door 35 are provided between the first compartment 12 and the circulation chamber 20, and the second discharge door 40 is provided between the bus bar compartment 15 and the circulation chamber 20. When an arc is generated in the first compartment 12 or the bus bar compartment 15, the first discharge door 30 or the second discharge door 40 is opened so that the arc is discharged to the circulation chamber 20.

On an upper surface of the first compartment 12, there may be formed a plurality of discharge holes 21 at a portion where the first discharge door 30 is provided.

Here, the first discharge door 30 and the second discharge door 40 form a predetermined angle (e.g., 90 degrees) with each other. This is because the first compartment 12 and the second compartment 15 are each disposed on a lower surface and a rear surface of the circulation chamber 20, respectively.

A fourth discharge door 17, a fifth discharge door 18, and a sixth discharge door 19 are each provided on an upper surface of each of the second breaker compartment 13, the bus bar compartment 15, and the cable compartment 16, so that high-temperature and high-pressure gas is discharge when an arc is generated.

Between the first discharge door 30 and the second discharge door 40, there is provided the linking means 50 to exclusively open any one of the first discharge door 30 and the second discharge door 40.

The linking means 50 may include a first fixing member 51 fixed to a part of the first discharge door 30, a second fixing member 55 fixed to a part of the second discharge door 40, and a connecting member 60 with one end thereof rotatably coupled to the first fixing member 51 and another end thereof rotatably coupled to the second fixing member 55.

Referring to FIG. 3, the first fixing member 51 may be mounted on a first upper end portion 31 of the first discharge door 30, and the second fixing member 55 may be mounted on a second upper end portion 41 of the second discharge door 40. The first fixing member 51 and the second fixing member 55 each may be coupled to the first discharge door 30 and the second discharge door 40, respectively, by welding, screwing, bonding, fitting, etc.

The first fixing member 51 has a first hole 52 and the second fixing member 55 has a second hole 56, and the connecting member 60 may be fastened to each of the first hole 52 and the second hole 56.

The connecting member 60 is coupled to the first fixing member 51 and the second fixing member 55. The connecting member 60 may be implemented as a bar, a rod, or a string. The connecting member 60 may be made of metal, synthetic resin, etc. When the connecting member 60 is implemented as a string, it has an appropriate tension so that any one of the discharge doors 30 and 40 is kept open.

The connecting member 60 has a length that keeps any one discharge door open. In other words, the length of the connecting member 60 is shorter than a distance between the first fixing member 51 and the second fixing member 55 in a state in which the first discharge door 30 and the second discharge door 40 are closed. Accordingly, one of the first discharge door 30 and the second discharge door 40 is in an open state. Typically, since the second discharge door 40 receives a force that maintains a closed state by a spring member (not shown), the first discharge door 30 may be in an open state.

In other words, the first discharge door 30 is opened in a steady state to allow the first compartment 12 to be in a ventilated state, and therefore, it is advantageous in lowering a temperature inside the first compartment 12. When an arc accident occurs in the first compartment 12, the arc is immediately discharged to the circulation chamber 20 through the discharge hole 21 as the first discharge door 30 is in an open state.

Meanwhile, when an arc accident occurs in the second compartment 15, the second discharge door 40 is opened by a pressure of arc gas to thereby discharge the arc gas, and the first discharge door 30 connected to the second discharge door 40 by the connecting member 60 is closed so that the arc gas does not enter the first compartment 12.

Figure 4:
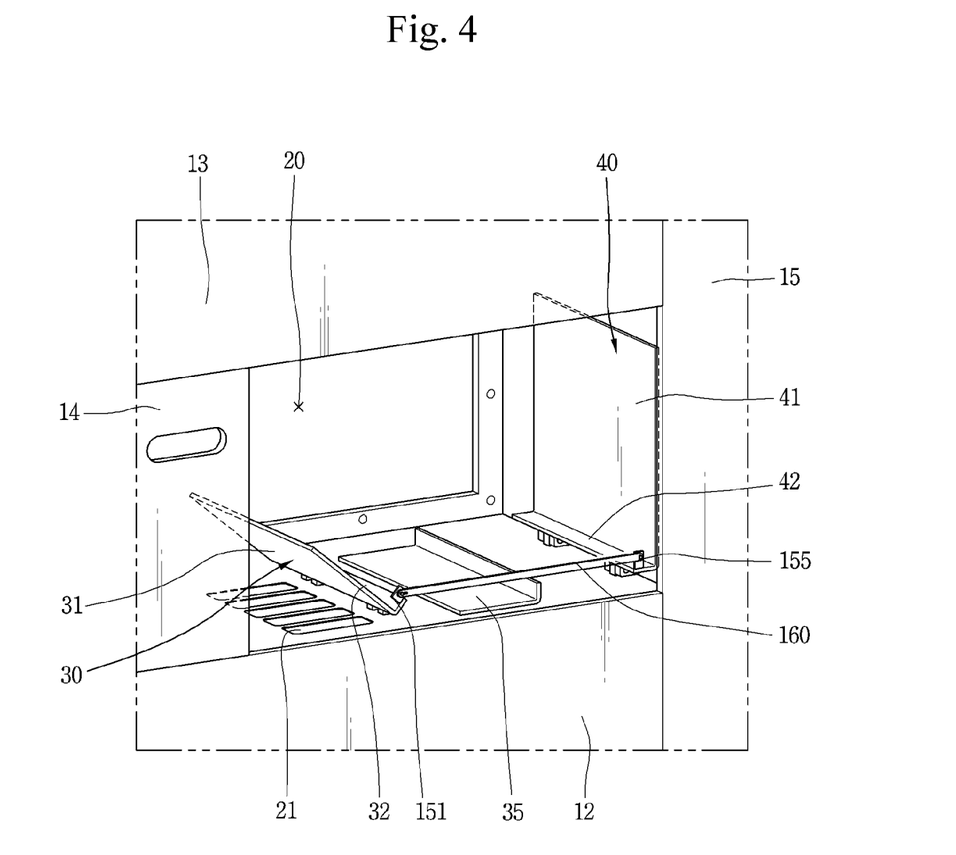
FIG. 4 is a detailed view of a distribution board to which a linking means in accordance with another embodiment of the present disclosure is applied.
Figure 5:
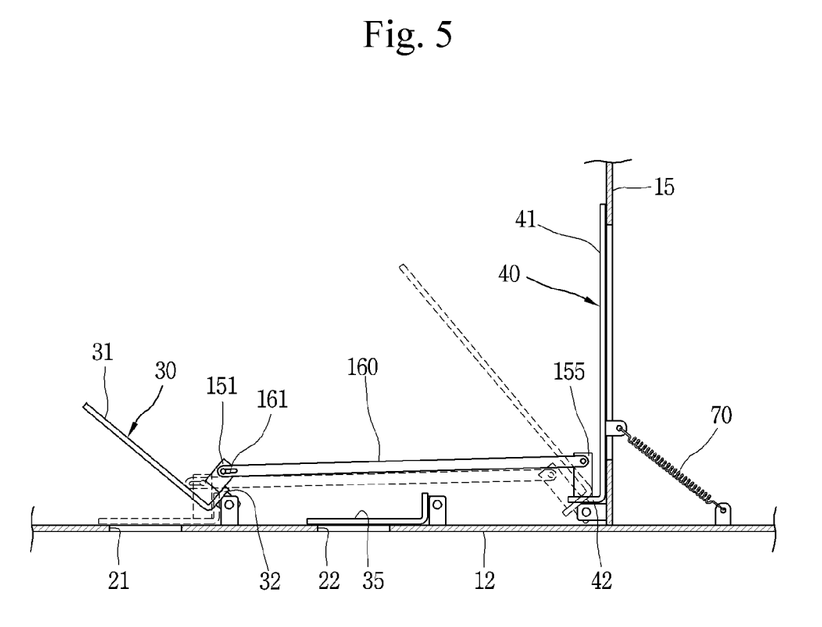
FIG. 5 is a front view of FIG. 4.
Figure 6:
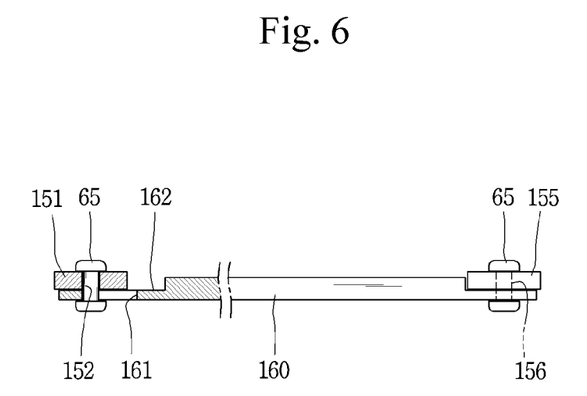
FIG. 6 is a planar view of a linking means in FIG. 4.

Referring to FIGS. 4 to 6, a distribution board to which a linking means according to another embodiment of the present disclosure is applied will be described.

In this embodiment, the linking means may include a first fixing member 151 fixed to a part of the first discharge door 30, a second fixing member 155 fixed to a part of the second discharge door 40, and a connecting member 160 with one end thereof rotatably coupled to the first fixing member 151 and another end thereof rotatably coupled to the second fixing member 155.

Here, the first fixing member 151 is mounted on a first skirt portion 32 at a lower end of the first discharge door 30, and the second fixing member 155 is mounted on a second skirt portion 42 at a lower end of the second discharge door 40.

The first fixing member 151 may be mounted in a direction same as a direction in which the first skirt portion 32 is extended, and the second fixing member 155 may be mounted in a direction perpendicular to a direction in which the second skirt portion 42 is extended.

At least one of the first discharge door 30 and the second discharge door 40 may be provided with a spring member 70 so that one of the discharge doors is in a closed state.

The connecting member 160 is configured as a rigid body. Accordingly, when the first discharge door 30 or the second discharge door 40 rotates, the connecting member 160 moves accordingly. In a mechanical point of view, the connecting member 160 has a motion trajectory including horizontal motion and rotational motion.

The connecting member 160 may be fastened by a fastening member 65 to a first hole 152 of the first fixing member 151 and a second hole 156 of the second fixing member 55, respectively. Here, the fastening member 65 may be implemented as nuts, bolts, pins, keys, rivets, and the like.

Opposite ends of the connecting member 160 each has a connection hole 161 communicating with each of the first hole 152 and the second hole 156. Any one of the connection holes 161 may be implemented as a sliding hole. This may compensate a difference between a distance in which one end of the connecting member 160 is moved according to a rotation of the first discharge door 30 and a distance in which another end of the connecting member 160 is moved according to a rotation of the second discharge door 40.

Opposite ends of the connecting member 160 each has a grooved stepped portion 162, so that the first fixing member 151 and the second fixing member 155 are each coupled thereto.

The connecting member 160 has a length that keeps any one discharge door open. In other words, the length of the connecting member 60 is shorter than a distance between the first fixing member 151 and the second fixing member 155 in a state in which the first discharge door 30 and the second discharge door 40 are closed. Accordingly, one of the first discharge door 30 and the second discharge door 40 is in an open state. Typically, since the second discharge door 40 receives a force that maintains a closed state by the spring member 70, the first discharge door 30 may be in an open state.

In other words, the first discharge door 30 is opened in a steady state to allow the first compartment 12 to be in a ventilated state, and therefore, it is advantageous in lowering a temperature inside the first compartment 12. When an arc accident occurs in the first compartment 12, the arc is immediately discharged to the circulation chamber 20 through the discharge hole 21 as the first discharge door 30 is in an open state.

Meanwhile, when an arc accident occurs in the second compartment 15, the second discharge door 40 is opened by a pressure of an arc gas to thereby discharge the arc gas, and the first discharge door 30 connected to the second discharge door 40 by the connecting member 160 is closed so that the arc gas does not enter the first compartment 12.

Figure 7:
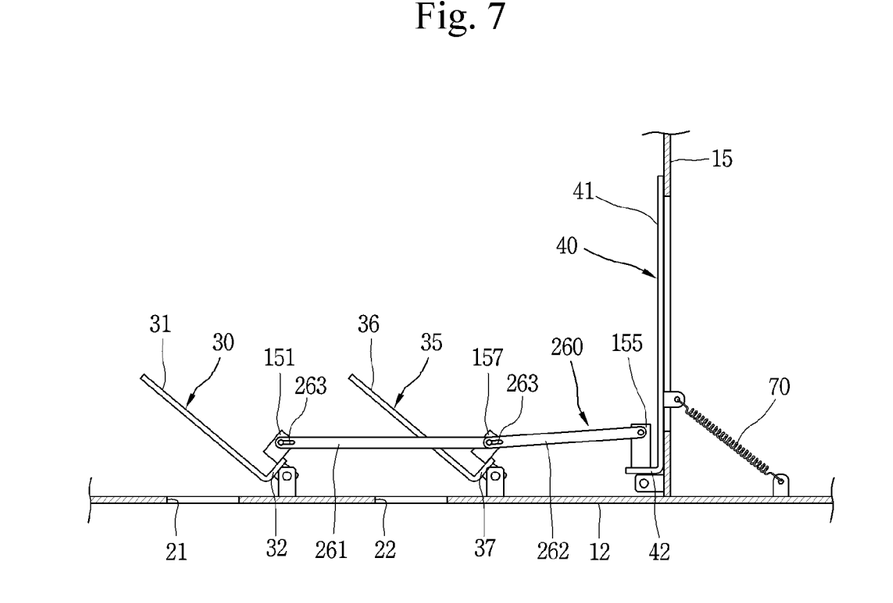
FIG. 7 is a partial front view of a distribution board to which a linking means in accordance with still another embodiment of the present disclosure is applied.

Referring to FIG. 7, a distribution board to which a linking means according to still another embodiment of the present disclosure is applied will be described.

In this embodiment, the linking means may include: a first fixing member 151 and a third fixing member 157 each fixed to a part of a first discharge door 30 and a part of a third discharge door 35, respectively, that are provided on an upper surface of a first compartment 12; a second fixing member 155 fixed to a part of a second discharge door 40 provided on a front surface of a second compartment 15; and a connecting member 260 with one end thereof rotatably coupled to the first fixing member 151, another end thereof rotatably coupled to the second fixing member 155, and an intermediate portion thereof slidably coupled to the third fixing member 157.

Here, the first fixing member 151 is mounted on a first skirt portion 32 at a lower end of the first discharge door 30, the second fixing member 155 is mounted on a second skirt portion 42 at a lower end of the second discharge door 40, and the third fixing member 157 is mounted on a third skirt portion 37 of the third discharge door 35.

The first fixing member 151 may be mounted in a direction same as a direction in which the first skirt portion 32 is extended, and the second fixing member 155 may be mounted in a direction perpendicular to a direction in which the second skirt portion 42 is extended. In addition, the third fixing member 157 may be mounted in a direction same as a direction in which the third skirt portion 37 is extended.

At least one of the first discharge door 30 and the second discharge door 40 may be provided with a spring member 70 so that one of the discharge doors is in a closed state.

The connecting member 260 is configured as a rigid body. Accordingly, when the first discharge door 30 or the second discharge door 40 rotates, the connecting member 260 moves accordingly. In a mechanical point of view, the connecting member 260 has a motion trajectory including horizontal motion and rotational motion.

The connecting member 260 may be fastened by a fastening member 65 to a first hole (not shown) of the first fixing member 151 and a second hole (not shown) of the second fixing member 155, respectively. Here, the fastening member 65 may be implemented as nuts, bolts, pins, keys, rivets, and the like. Meanwhile, the intermediate portion of the connecting member 260 may be fastened to the third fixing member 157 by the fastening member 65.

The intermediate portion of the connecting member 260 may be bent. In other words, the connecting member 260 may include a first connecting portion 261 connecting between the first fixing member 151 and the third fixing member 157, and a second connecting portion 262 connecting between the second fixing member 155 and the third fixing member 157. The first connecting portion 261 and the second connecting portion 262 may form a predetermined angle therebetween. This may compensate differences in mechanical movement according to rotations of the first fixing member 151, the second fixing member 155, and the third fixing member 157.

Opposite ends of the connecting member 260 each has a connection hole 263 communicating with each of the first hole 152 and the second hole 156. At least one of the connection holes 263 may be implemented as a sliding hole. For example, the connection holes 263 each connected to the first fixing member 151 and the third fixing member 157 may be implemented as a sliding hole. This may compensate a difference between a distance in which one end of the connecting member 260 is moved according to a rotation of the first discharge door 30 and a distance in which another end of the connecting member 260 is moved according to a rotation of the second discharge door 40.

Opposite ends of the connecting member 260 each has a grooved stepped portion (not shown), so that the first fixing member 151 and the second fixing member 155 are each coupled thereto.

The connecting member 260 has a length that keeps any one discharge door open. In other words, the length of the connecting member 260 is shorter than a distance between the first fixing member 151 and the second fixing member 155 in a state in which the first discharge door 30 and the second discharge door 40 are closed. Accordingly, one of the first discharge door 30 and the second discharge door 40 is in an open state. Typically, since the second discharge door 40 receives a force that maintains a closed state by the spring member 70, the first discharge door 30 may be in an open state.

In other words, the first discharge door 30 is opened in a steady state to allow the first compartment 12 to be in a ventilated state, and therefore, it is advantageous in lowering a temperature inside the first compartment 12. When an arc accident occurs in the first compartment 12, the arc is immediately discharged to the circulation chamber 20 through discharge holes 21 and 22 as the first discharge door 30 and the third discharge door 35 are in open states.

Meanwhile, when an arc accident occurs in the second compartment 15, the second discharge door 40 is opened by a pressure of an arc gas to thereby discharge the arc gas, and the first discharge door 30 and the third discharge door 35 connected to the second discharge door 40 by the connecting member 260 are closed so that the arc gas does not enter the first compartment 12.

With regard to the distribution board ventilation system according to an embodiment of the present disclosure, a discharge door of a compartment that needs air circulation is opened in a steady state and a discharge door of another compartment adjacent thereto is closed. And, when an arc is generated, a discharge door of a compartment where the arc is generated is opened and a discharge door of another compartment adjacent thereto is closed. Accordingly, the discharge door may effectively perform conflicting functions which serves as a passage with being opened for air circulation in a normal state and for arc discharge in an arc accident, and as a closing portion with being closed in an arc accident.

The foregoing embodiments are to implement embodiments of the present disclosure. Therefore, those skilled in the art to which the present disclosure pertains various modifications and variations will be possible without departing from the essential characteristics of the present disclosure. Therefore, the embodiments disclosed in the present disclosure are not intended to limit the technical idea of the present disclosure but to describe the present disclosure, and the scope of the technical idea of the present disclosure is not limited by these embodiments. The true scope of the present disclosure should be interpreted by the following claims, and all technical ideas within the equivalent scope should be interpreted as being included in the scope of the present disclosure.

The invention claimed is:

1. A distribution board ventilation system, comprising:
   a circulation chamber serving as a passage for air circulation and arc discharge;
   a first compartment provided at one surface of the circulation chamber;
   a second compartment which is adjacent to the first compartment and provided at another surface adjacent to the one surface of the circulation chamber;
   a first discharge door mounted on the one surface of the circulation chamber to open the first compartment;
   a second discharge door mounted on the another surface of the circulation chamber to open the second compartment; and
   a linking means which is mounted between the first discharge door and the second discharge door, the linking means comprises:
      a first fixing member fixed to a part of the first discharge door,
      a second fixing member fixed to a part of the second discharge door, and
      a connecting member with one end thereof rotatably coupled to the first fixing member and another end thereof rotatably coupled to the second fixing member,
   wherein the linking means ensures that open states of the first discharge door and the second discharge door are mutually exclusive.

2. The distribution board ventilation system of claim 1, wherein the first fixing member is mounted on an upper end portion of the first discharge door, and the second fixing member is mounted on an upper end portion of the second discharge door.

3. The distribution board ventilation system of claim 1, wherein the first fixing member is mounted on a first skirt portion at a lower end of the first discharge door, and the second fixing member is mounted on a second skirt portion at a lower end of the second discharge door.

4. The distribution board ventilation system of claim 3, wherein the first fixing member is mounted in a direction same as a direction in which the first skirt portion is extended, and the second fixing member is mounted in a direction perpendicular to a direction in which the second skirt portion is extended.

5. The distribution board ventilation system of claim 1, wherein the first fixing member has a first hole and the second fixing member has a second hole, and the connecting member is fastened to each of the first hole and the second hole by a fastening member.

6. The distribution board ventilation system of claim 5, wherein opposite ends of the connecting member each has a connection hole communicating with each of the first hole and the second hole.

7. The distribution board ventilation system of claim 6, wherein any one of the connection holes is implemented as a sliding hole.

8. The distribution board ventilation system of claim 1, wherein a length of the connecting member is shorter than a distance between the first fixing member and the second fixing member in a state in which the first discharge door and the second discharge door are closed.

9. The distribution board ventilation system of claim 1, further comprising: a third discharge door mounted on the one surface of the circulation chamber to open the first compartment, wherein an intermediate portion of the connecting member is connected to the third discharge door.

10. The distribution board ventilation system of claim 9, wherein the connecting member comprises a first connecting portion connecting the first discharge door and the third discharge door, and a second connecting portion connecting the third discharge door and the second discharge door and forming a predetermined angle with the first connecting portion.

* * * * *